United States Patent
Yada et al.

(10) Patent No.: US 6,639,885 B1
(45) Date of Patent: Oct. 28, 2003

(54) DISK RECORDING/REPRODUCTION DEVICE, AND INFORMATION PROCESSING SYSTEM INCORPORATING A DISK RECORDING/REPRODUCTION DEVICE THEREOF

(75) Inventors: Hiroaki Yada, Kanagawa (JP); Hiroshi Kanno, Kanagawa (JP)

(73) Assignee: Sony Corporation, Tokyo (JP)

( * ) Notice: Subject to any disclaimer, the term of this patent is extended or adjusted under 35 U.S.C. 154(b) by 307 days.

(21) Appl. No.: 09/599,656

(22) Filed: Jun. 21, 2000

(30) Foreign Application Priority Data

Jun. 22, 1999 (JP) .......................................... P11-175803

(51) Int. Cl.[7] ................................................ G11B 3/90
(52) U.S. Cl. .................................................. 369/53.45
(58) Field of Search .......................... 369/30.01, 30.03, 369/32.01, 33.01, 47.13, 47.15, 47.55, 53.37, 53.45

(56) References Cited

U.S. PATENT DOCUMENTS 4,953,153 A * 8/1990 Suzuki ..................... 369/47.16
6,449,423 B1 * 9/2002 Takahashi et al. ............ 386/52

* cited by examiner

Primary Examiner—Paul W. Huber
(74) Attorney, Agent, or Firm—Frommer Lawrence & Haug LLP; William S. Frommer; Darren M. Simon

(57) ABSTRACT

A disk recording/reproduction device ideal for processing audio-visual data streams requiring real-time characteristics. A disk device has an operating mode ideal for recording and reproduction of motion image and audio data requiring real-time continuity by limiting the time needed for error processing, and the host incorporating the disk device can easily monitor the real-time continuity. The host can specify the urgency of individual recording and reproduction instructions to the disk so that control of real-time continuity can be actively implemented in better detail. A means for assigning a total number to a plurality of simultaneously recorded or reproduced data streams as well assigning individual data stream numbers allows informing the disk device of the throughput required by the host.

1 Claim, 7 Drawing Sheets

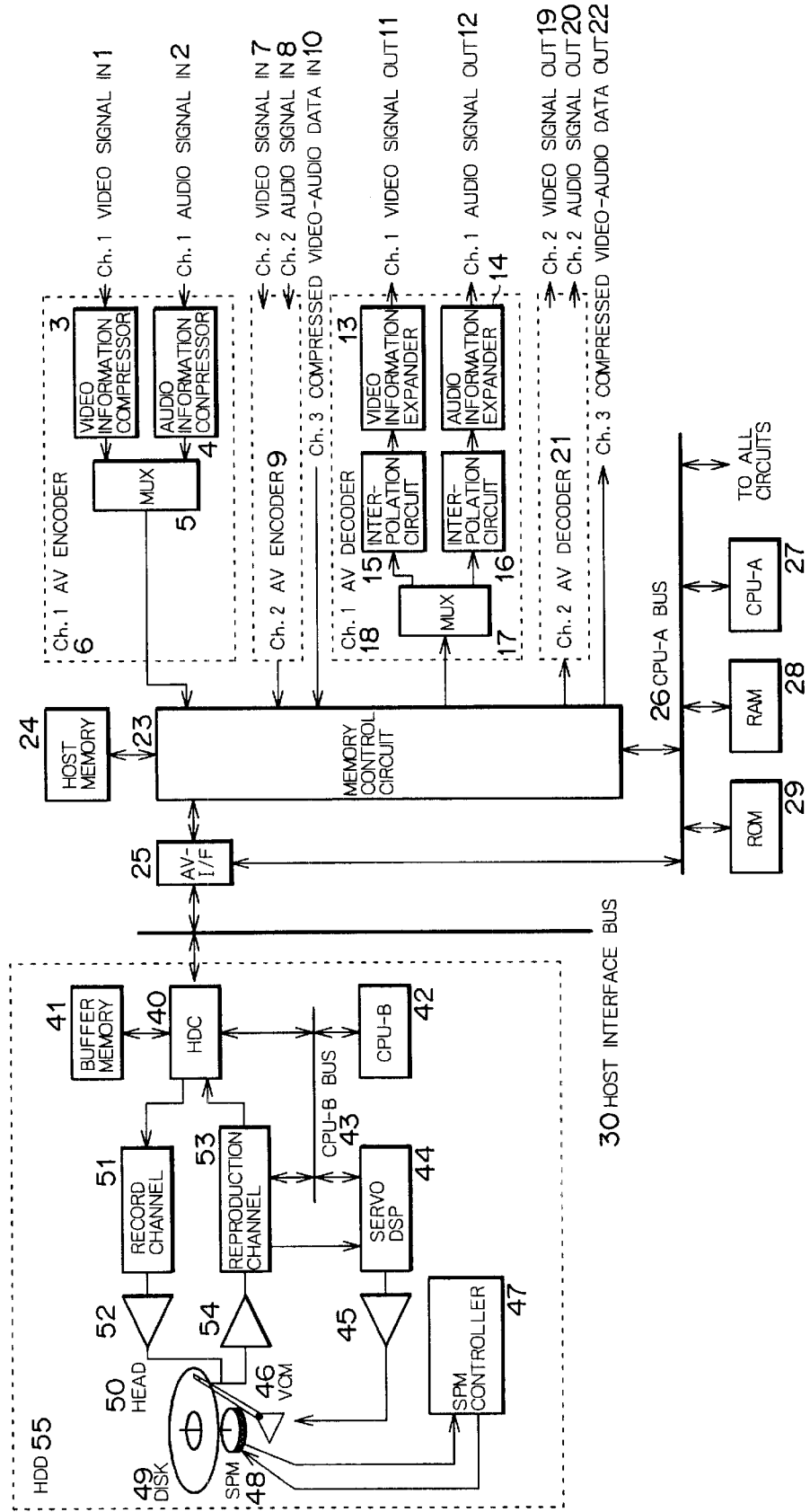
F I G. 1

F I G. 2
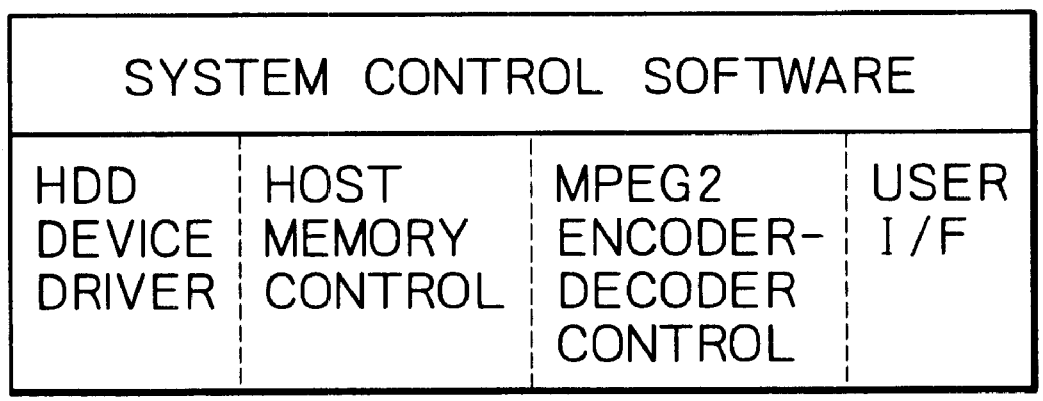

FIG. 3

EXAMPLE: MPEG2 AT 8M bits/S

VIDEO DATA STREAM Ch. 1:
- 1/30 SEC.×15 FRAMES = 0.5 SECOND INTERVAL
- GOP(k): I B P B P B P B P B P B P B P
- 1/30 SEC.×15 FRAMES = 0.5 SECOND INTERVAL
- GOP(k+1): I B P B P B P B P B P B P B P
- DATA QUANTITY: 4M bits CLUSTER (HDD RECORD/REPRODUCTION DATA UNITS):
- 0.125 SEC. INTERVAL
- CLUSTER (k,1), CLUSTER (k,2), CLUSTER (k,3), CLUSTER (k,4), CLUSTER (k+1,1), CLUSTER (k+1,2), CLUSTER (k+1,3), CLUSTER (k+1,4)
- DATA QUANTITY: 1M bits DATA SECTOR (HDD MINIMUM RECORD/REPRODUCTION DATA UNITS):
- SECTOR (k,1,1), SECTOR (k,1,2), SECTOR (k,1,3), ......, SECTOR (k,1,256)
- DATA QUANTITY: 512 Bytes (4096 bits)

DISK RECORDING/REPRODUCTION DEVICE, AND INFORMATION PROCESSING SYSTEM INCORPORATING A DISK RECORDING/REPRODUCTION DEVICE THEREOF

BACKGROUND OF THE INVENTION

1. Field of the Invention

The present invention relates to a data recording/reproduction device for recording and reproducing data of all types such as computer data and relates in particular to random access type data recording/reproduction devices. More specifically, the present invention relates to disk type data recording/reproduction devices utilized while mounted in a host device such as a computer system and relates in particular to disk type data recording/reproduction devices for recording and reproducing for recording and reproducing computer data requiring reliability, and video data and audio data requiring real-time characteristics.

2. Description of the Related Art

All types of information processing systems such as general-purpose computers contain a data recording/reproduction device to store large quantities of data and data for large scale applications in a non-volatile manner. Data recording/reproduction devices are for example comprised of disk type devices to store data on a rotating disk and tape type devices to store data on wound reel of tape.

A typical disk device is the HDD or hard disk drive. The hard disk drive has an amazing data storage capacity due to advances made in magnetic head technology and signal processing technology, etc. From 1990 up to the present for example, the surface recording density of data has increased approximately 60 percent each year. One 3.5 inch disk is expected to be capable of recording 10 to 20 gigabytes of data some time after the year 2000. In other words, one hard disk drive unit having a plurality of disks would have a recording capacity in excess of 100 gigabytes.

Therefore, by utilizing high efficiency digital moving picture compression technology such as DV (digital video) or MPEG2 (Moving Picture Experts Group Phase 2) made practical in recent years, moving picture information for a plurality of channels can be recorded on and reproduced from a hard disk drive, and multichannel video recorders capable of using a hard disk drive as a recording medium are now feasible.

However, from a historical point of view the hard disk drive was developed as an external storage device for computers and technical progress has been made in improving so-called discrete text type data and in making random access of data as fast as possible. In other words, hard disk drive operation is broken up or discrete along the time axis.

The computer system (hereafter "host") incorporating the hard disk drive (HDD) issues commands (hereafter "host commands") specifying the recording or reproduction of data. The operations in response to each command from the host are executed one at a time as discrete operations. Restated, the hard disk drive guarantees high reliability but does not guarantee the recording or reproduction operation will finish within a specified time (real time guarantee).

One cause that prevents guaranteeing the actual time required for an operation is the retry process. The recording and reproduction of data on a hard disk drive is performed in short data sector unit (for example 512 bytes each) equivalent to the (information) packet used in communications technology. In the retry process, an operation is repeated again when an error occurs in implementing instructions such as to perform recording or reproduction of a data sector assigned by the host.

Various types of errors cause the retry operation to be used. On such error is in the operation (seek) to move the head to the target sector. To resolve the seek error, the recording and reproducing onto that target sector must be abandoned and continued elsewhere or retry operation must be performed. One retry requires from a few to several dozen milliseconds of wasted time and is a factor in poor real-time characteristics. Next, is retries (Write—Retry) during recording of data. If a deviation in the head position exceeding the established tolerance occurs such as from mechanical shock applied for example externally onto the hard disk drive during recording onto one data sector, then the recording operation will be halted. After waiting for the head to be restored to a normal position and the head to once again come to a position directly above the applicable sector by disk rotation, the recording of data onto the applicable sector starts once again (Write—Retry).

A third cause is retries (Read—Retry) during data reproduction (or playback). When an error is determined to occur that exceeds the correction capacity of the ECC (error correction code) in each sector during reproduction of one data sector, the operation stands by until the head once again comes to a position directly above the applicable sector by disk rotation and reproduction of the applicable sector starts again (Read—Retry). Further, when determined that the error was not corrected by one Read—Retry, a second Read—Retry is implemented. If the error is not a soft error due for example to noise, but is a hard error due definite cause such as damage of the magnetic film on the disk, then Read—Retry might be attempted 10 times or more without correctly reading the data, thus requiring at least 100 milliseconds of wasted time. Retries can therefore be a fatal problem in guaranteeing the actual time for a recording/reproduction operation.

The maximum number of retries implemented and other such error processing methods are fixedly incorporated into the design of related hard disk drives so that effective control according to the overall status of the disk recorder was not possible. Also, in the related art, a means was proposed for implementing or prohibiting retries without restrictions (For example, in a portion of the interfaces standards, of the ATA (AT-Attachment) established by ANSI (American National Standards Institute)) however a means for setting a maximum allowable time required for error processing, or a means for dynamic control according to the urgency or criticality (namely, the real-time characteristics) of recording and reproduction were not proposed.

In the disk type data recording/reproducing device of the related art, it was also assumed that data files would be handled discretely from each other so that instructions for recording or reproducing on individual sectors were treated as mutually unrelated items. So in applications such as multi-channel video and recorders with hard disk drives, even when recording/reproducing with a small number of long AV data streams, information on what data stream that the data for a recording/reproducing instruction belonged to was not utilized.

Therefore as related above, in the related art, the host device incorporating the disk type data recording/reproducing device had no simple means for monitoring items such as the error processing time of the disk device. Consequently, the related art had the problem that the continuous real time required during the recording or reproducing of information such as moving picture or audio information could not be guaranteed.

Still further, in the disk type data recording/reproducing device of the related art, the individual recording/reproducing operations were implemented without assigning a mutual rank or order (relation) so that a high throughput could not always be maintained.

SUMMARY OF THE INVENTION

In view of the above technical problems with the related art, the present invention therefore has the object of providing a disk type data recording/reproducing device ideal for processing suited for recording/reproducing of audio-visual data streams requiring real-time characteristics.

A further object of the present invention is to provide a disk type data recording/reproducing device ideal for maintaining the continuous real time characteristics for video recorders, and at the same time improve the average data rate and the number of audio-visual data streams capable of record/reproduction, and capable of high speed recording/reproducing of high quality audio-visual data.

In view of the above technical issues, according to one aspect of the present invention, the disk type data recording/reproducing device has a first operation mode for recording or reproduction of non-continuous information and, a second operating mode for recording or reproduction of continuous information.

A typical example of the continuous information referred to here is continuous image information compressed with the MPEG2 (Motion Picture Experts Group phase 2) method.

According to another aspect of the present invention, the disk type data recording/reproducing device has a first operation mode stressing reliability of data more than real time characteristics of recording and reproduction and, a second operation mode stressing real time characteristics more than the reliability of the data.

According to another aspect of the present invention, the disk type data recording/reproducing device comprises a disk as the recording medium, a record/reproduction section for recording and reproducing on the disk, and an error processing section for recovery from errors occurring during the recording or reproducing on the disk, wherein the disk type data recording/reproducing device has a first operation mode with a maximum allowable error processing time more than a specified value in the error processing section and, a second operation mode with a maximum allowable error processing time less than a specified value in the error processing section.

The disk type data recording/reproducing device according to another aspect of the present invention is connected to a host system by way of a host interface, and besides recording and reproducing on the disk according to recording or reproducing commands received by way of the host interface, may be changed to the first operation mode or second operation mode according to a status change command received by way of the host interface.

The disk type data recording/reproducing device may also have means for actively performing an error processing procedure during the operation mode without being restricted by error processing time capacity, according to the urgency (criticality) for executing the recording or reproducing commands received by way the host interface.

The disk type data recording/reproducing device may also be capable of setting a large number of channels capable of simultaneous record or reproduction by using status change commands.

The disk type data recording/reproducing device according to another aspect of the present invention comprises a disk as a recording medium, a recording/reproducing section for performing record or reproduction on the disk, and an error processing section for restoring operation when an error occurs during recording or reproduction on the disk, wherein during recording a maximum allowable error processing time can be set in the error processing section, and during reproduction a maximum allowable error processing time can be set in the error processing section.

The disk type data recording/reproducing device according to another aspect of the present invention is connected to a host system by way of a host interface, and besides recording and reproducing on the disk according to recording or reproducing commands received by way of the host interface, a maximum allowable error processing time can be set by the error processing section according to status change commands received by the host interface.

The disk type data recording/reproducing device contains means for actively changing the error processing procedure without being restricted by the maximum allowable error processing time, according to the urgency (criticality) for executing the recording or reproducing commands received by way of the host interface.

The disk type data recording/reproducing device may also be capable of setting a maximum number of channels capable of simultaneous record or reproduction by using status change commands.

The disk type data recording/reproducing device according to another aspect of the present invention comprises a disk as a recording medium, a recording/reproducing section for performing recording or reproducing on the disk, an error processing section for restoring operation when an error occurs during recording or reproduction on the disk, and a buffer memory for temporarily storing recording or reproduction data, wherein the disk type data recording/reproducing device further comprises means for setting a maximum number of channels capable of simultaneous record or reproduction according to commands from the host and, means for changing internal data such as error processing procedures and areas assigned to the buffer memory, according to the maximum number of channels.

The disk type data recording/reproducing device according to another aspect of the present invention operates according to commands from a host system connected by way of a host interface and comprises a disk as a recording medium, a recording/reproducing section for performing recording or reproducing on the disk, and a buffer memory for temporarily storing recording or reproduction data, wherein said disk type data recording/reproducing device further comprises stream identifiers in recording or reproduction commands received from the host showing the data stream that data for recording or reproduction belongs to, and further comprises control means for adaptably controlling internal processing such as reference means for the buffer memory according to the stream identifiers.

The disk type data recording/reproducing device according to the various aspects of the present invention is utilized while connected to an external host system by way of a host interface in conformance with ATA (AT-Attachment) interface standards decided for instance by ANSI (American National Standards Institute) standards. One example of a host system is a digital image disk recorder for recording and reproducing data streams such as for video and audio data on the disk device of the present invention. The host system preferably utilizes a command set capable of being processed by the disk device in an operating mode limited by a specified error processing time.

The present invention was contrived based on the fact that the need for data reliability and for real time characteristics change according to the type of data handled by the HDD.

For instance, data reliability is indispensable in order for a hard disk drive (HDD) to handle computer data. Computer data containing errors is worthless for computer processing, and requires processing time and error correction.

In contrast, when a hard disk drive (HDD) handles audiovisual data, the recording and reproducing of data with real-time characteristics has the most importance and data reliability can be sacrificed to some extent. The reason being that even if the reproduced audio or video contains errors to some extent in the data, the limited range of human visual and audio perception allows those errors to be ignored or compensated. However if the real-time characteristics cannot be maintained, then the video or audio may intermittently cut off to an extent that cannot be ignored or compensated for, and the service quality will drastically deteriorate.

The disk type data recording/reproducing device (hereafter, simply referred to as "disk device") of the present invention, besides having an operation mode for recording or reproduction of non-continuous information (in other words, discrete information), further has an operating mode for recording or reproduction of continuous information. The non-continuous information operation mode, hereafter referred to as IT (information technology) mode, is for handling data requiring high reliability such as computer data. The continuous information operation mode, hereafter referred to as AV (audio visual) mode, is for handling data requiring real time characteristics such as moving picture and audio data.

The disk device of the present invention can be connected by way of a host interface to a "host" such as a general-purpose computer or a digital motion picture recorder. This disk device further has a means to switch operation modes by way of the host interface, and has a means to set the allowable error processing time during recording or reproduction according to the mode switching. Therefore, in this disk device, the allowable error time can be actively set for IT (information technology) mode when highly reliable discrete information is required, or for AV (audio visual) mode for continuous information that requires real time characteristics.

The disk device also contains information indicating the urgency (criticality) in the individual recording or reproducing commands. The disk device also has an instruction means to assign information to individual data stream numbers and total channel numbers constituting a plurality of simultaneously recorded or reproduced data streams, and further has a means to change the operation inside the disk device based on this assigned information.

The disk device of the present invention in other words, possesses operation modes for recording and reproduction of moving picture data and audio data requiring real-time continuity, by means of limiting the error processing time. The host incorporating the disk device can therefore easily control the real-time continuity.

The host can implement even finer active control of the real-time continuity by specifying the urgency (criticality) in the individual record/reproduction instructions to the disk device.

The host can also inform the disk device of the required throughput by possessing a means to assign individual stream numbers and total channel numbers constituting a plurality of simultaneously recorded or reproduced data streams. The disk device is therefore capable of optimal internal processing such as data buffering.

Other objects of the invention, unique features and benefits will become apparent from the detailed description of the invention related next while referring to the accompanying drawings.

BRIEF DESCRIPTION OF THE DRAWINGS

FIG. 1 is a block diagram showing the hardware structure of the digital motion picture disk recorder incorporating the HDD 55 used as the recording medium of the embodiment of the present invention.

FIG. 2 is a drawing showing the hierarchical structure of the firmware implemented in the CPU-A27.

FIG. 3 is a diagram showing the relation of the GOP (Group of Pictures) defined in the MPEG2 data stream, and the clusters as units for recording or reproducing data on the HDD 55.

DETAILED DESCRIPTION OF THE PREFERRED EMBODIMENTS

Figure 4:
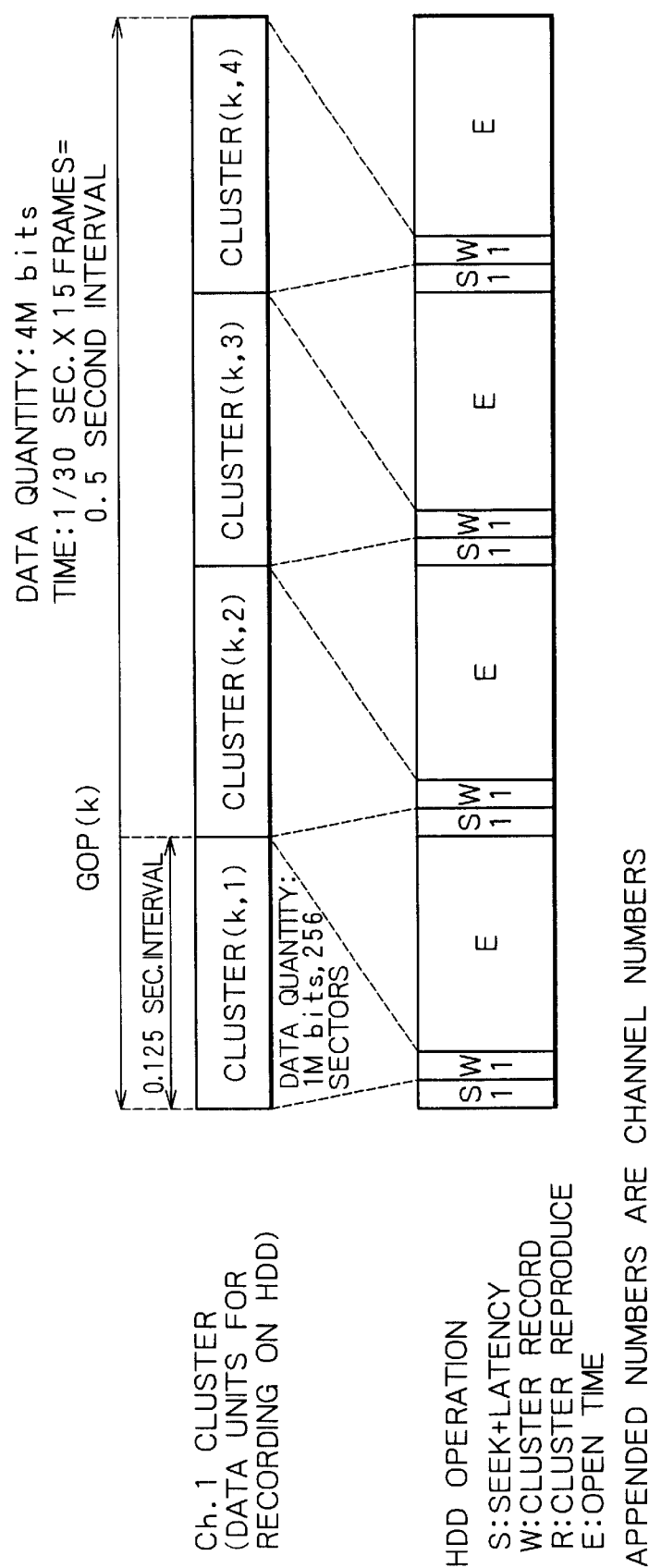
FIG. 4 is a timing chart showing a typical operation of the HDD 55 when recording only one data stream.

The embodiments of the disk device and the information processing system utilized in the present invention are explained next. The following embodiments are described by utilizing a typical fixed-type hard disk drive (HDD) as an example, however the present invention is not necessarily limited to this type of hard disk drive. Other magnetic disk drives using a disk as the recording medium such as replaceable bubble HDD, floppy disk drives (FDD) or optical disk drives may of course serve the same purpose in the present invention. It should also be understood that optical hard disk devices incorporating a floating slider in the optical disk also may serve the same purpose in the present invention.

As one embodiment of the present invention, FIG. 1 is a block diagram showing the hardware structure of the digital moving picture disk recorder incorporating HDD 55 as the recording medium. The digital moving picture disk recorder is capable of recording or reproduction of digital video information and audio information. Hereafter, each section is explained.

In FIG. 1, the digital motion picture recorder functions as the "host" for the HDD 55. In other words, one HDD 55 unit is connected to the host by way of the host interface bus 30. The host interface bus 30 may utilize standards such as expansion IDE (Integrated Drive Electronics) standards (equivalent to the previously mentioned ATA standards of ANSI) as specifications. However, the present invention is not restricted to a particular type of interface standard, and may for instance utilize SCSI (small computer system interface) instead of the expansion IDE specifications to achieve the same effect of the invention.

The HDD 55 is configured to simultaneously record and/or reproduce compressed motion picture data and audio data on up to three channels. Of these three channels, channel 1 (Ch.1) and channel 2 (Ch. 2) are supplied with motion picture (image) data and audio data before compression. Besides storing this data in the HDD 55 by MPEG2 compression, the compressed motion picture data and audio data extracted from the HDD 55 is subjected to MPEG2 decompression (elongation) and output on a channel as a data stream. In contrast, channel 3 (Ch. 3) receives the motion picture (image) data and audio data after compression, and along with storing it in the HDD 55, transmits the compressed data as is (without decompression) from the HDD 55 on a channel as a data stream.

The overall operation of this digital motion picture disk recorder is coordinated by the CPU-A27. The CPU-A27 operates using firmware permanently stored in the ROM (Read Only Memory) 29, and utilizes the rewritable RAM (Random Access Memory) 28 as the operating area.

The digital motion picture disk recorder also has a user interface structure (not shown in drawing) to accept user instructions for the recorder. The user interface structure is comprised for instance of operating switches and buttons, remote controller, keyboard and liquid crystal display devices, etc.

The user inputs/output by way of the user interface structure are controlled by the CPU-A27 (or more specifically by firmware executed by the CPU-A27). The user input/outputs include instructions for record or reproduction of motion picture (image) data and audio data in the HDD 55. User input commands for the HDD 55 are implemented as instructions issued by the CPU-A27 to the host interface 30 by way of the CPU-A bus 26 and the AV I/F 25. Data exchange between the host and the HDD 55 is implemented by the CPU-A27 issuing commands to the memory control circuit 23 and the AV I/F 25. The host does not exchange the transferred data directly with the HDD 55 but temporarily stores it the host memory 24.

FIG. 2 shows the hierarchical structure of the firmware permanently stored in the ROM 29. The firmware is implemented in the CPU-A27 as mentioned previously.

Functions to directly implement the hardware operation are present in the lower layer which is the first layer. In this layer, the user I/F performs input/output in the user interface structure. The MPEG2 encoder/decoder operation controller performs MPEG" encoder and decoder processing for motion picture (image) data and audio data on channel 1 and channel 2. The host memory controller writes and reads-out AV data streams and clusters in the host memory 24 specified by the memory controller 23. The HDD device driver sends and receives data commands (host commands) to (and from) the HDD 55 by way of the host interface 30. The AV data stream processing host commands are defined in particular defined for the present invention as is related later on.

The second layer controls the just described second layer, or in other words is the system control software (equivalent to so-called "operating system") to control the overall operation of the digital motion picture disk recorder. The functions of the system control software include instruction and control of recording an reproduction operation on each channel, finding and controlling the operating status of hardware resources such as the HDD 55 and the host memory 24, functions required in the recorder and functions not contained in the first layer.

The flow of the recording signal during record throughout the digital motion picture disk recorder is described next.

In Ch. 1, after the externally input analog image signal 1 (for instance, NTSC (National Television System Committee) is digitized, the data rate is compressed up to approximately one-fifth the original rate in the image information compressor 3. In this type of compression method, the quantity of the original digital video information is compressed by implementing methods such as discrete cosine conversion, frame motion detection, requantization, and two-dimensional buffer encoding. In the following description, the MPEG2 system is employed as the video information compression method, and the data rate of the AV data stream is 8 Mbps.

Simultaneous with the analog image signal 1, an analog audio signal 2 is input externally, digitized and the data rate compressed by the audio information compressor 4. The compressed video and audio information is multiplexed in the MUX5 and incorporated into the AV data stream.

The analog image signal 7 and the analog audio signal 8 externally input in the Ch. 2 are in the same way, respectively subjected to image compression and audio compression, multiplexed and incorporated into the AV data stream.

The AV data streams from Ch. 1 or Ch. 2 are sequentially recorded in the host memory 27 temporarily, by way of the memory control circuit 23. The CPU-A27 outputs instructions to the memory controller 23 according to control implemented by the host memory controller from among the firmware, and reads out from the host memory 24 the data cluster (hereafter called "cluster") for recording on the HDD 55, sends the data cluster to the HDD 55 by way of the AV-I/F25 and the host interface bus 30, and records it on a disk 49. In other words, the host specifies a recording or reproducing of data in clusters, on the HDD 55.

FIG. 3 is a diagram showing the relation of the GOP (Group of Pictures) defined in the MPEG2 data stream, and the clusters as units for recording or reproducing data on the HDD 55.

One GOP is comprised of a consecutive I picture, B picture, and P picture to constitute an image of 15 frames (known art). In the example shown in FIG. 3, the clusters are data obtained from splitting a GOP into four parts. One frame is equivalent to ⅓₀th of a second so one GOP is equivalent to 0.5 seconds. The GOP data quantity is 4 Mbits so the data size found from dividing a one second portion of a data stream by 8 is 1 Mbit.

The usual sector size in an HDD 55 in the computer field is 512 bytes (or 4,096 bits) so that one cluster is equivalent to approximately 245 sectors. In other words, when a record command is received from the host (in other words, the motion picture data disk recorder) the HDD 55 consecutively records approximately 245 sectors.

The operation of the HDD 55 during record is explained next. To simplify the explanation, an example is described for recording on one channel, in other words only on the data stream from Ch. 1.

The CPU-A27 sends a host command (in this case a recording command) to the HDD 55 to start recording of one cluster of data from a LBA (logic block address) consisting of a data block of specified length on the disk 49.

The hard disk controller 40 (hereafter "HDC") inside the HDD 55 is comprised of an input register for receiving commands and data from the host, and an output register for returning data and the status inside the HDD 55 to the host.

When the HDC 40 receives a recording command from the host, the logic block address (LBA) specifying the recording command is converted to a physical address (The physical address referred to here is for instance specified by a disk side No, track NO. or sector No.) inside the HDD 55 by means of mutual active action with the CPU-B42.

Next, the cluster sent from the host memory 24 is received in the input register of HDC40 by way of the host interface bus 30, and temporarily stored in the buffer memory 41. One cluster holds (as mentioned before) a data quantity equal for instance to 245 sectors. The HDC40 divides up this received data into logic data sectors lengths (512 bytes) set on the track of the disk 49, and further adds a preamble pattern and error correction codes around these track sectors for achieving bit synchronization during readout, and after being formed into data sectors, is sent to the record channel circuit 51 in synchronization with the rotation of the disk.

The record channel 51 performs channel encoding of the data sectors and transforms the data into a binary train to match the magnetic record channel characteristics from the disk 49 and the head 50. The recording amplifier 52 adds a rectangular record current waveform to this binary train (string), and the head 50 records it as an inverted magnetic pattern on the magnetic disk 49.

Positioning of the head 50 on the target track set beforehand for recording is now necessary so the digital signal processor for servo control (servo DSP) 44 receives the target track No. from the HDC40 and CPU-B42, and while receiving the track No. on disk 49 from, the reproduction channel circuit 53, the servo DSP 44 moves the head 50 to that physical address and performs positioning.

In the above description, the time for used for recording one cluster is 125 milliseconds as shown in FIG. 4. The time required for seek and rotation standby (S1) on the HDD 55 and recording (W1) varies according to the speed of the HDD but is about 30 milliseconds. The remaining time (125-S1-W1) becomes surplus time (E).

The flow of the reproduction signal in the overall digital motion picture disk recorder is explained next.

The system controller software (mentioned previously) first designates the name of the AV data stream for reproduction, according to user input information from the user I/F of the firmware. The system controller software finds the logical block address (LBA) recorded with each cluster constituting the data stream. The system controller software issues a read-out instruction for the HDD device driver for the cluster to be read-out. The instruction issued by the HDD device driver is a host command defined on the host interface bus 30 (the expansion IDE interface in this embodiment). Simultaneous with issuing this instruction, the host memory controller maintains a recording area on the host memory 24 for recomprising the cluster read-out.

The read-out instruction issued on the host interface bus 30, in other words the recording command defined on the expansion IDE interface, is applied to the CPU-B42 inside the HDD 55 by way of the HDC40. The CPU-B42 converts the logical block address (LBA) of the applicable cluster into a physical address (The physical address is for instance specified by a disk side No, track No, and sector No., etc.) inside the HDD 55. The servo DSP44 commands the head 50 to move to that physical address, and start read-out of the required data. In other words, after the inverted magnetic pattern recorded on the magnetic disk 49 is read-out by the head 50 and amplified by the reproduction amplifier 54, bit-synchronizing is performed by the reproduction channel signal processor circuit 53, the binary data train (string) is detected, and decoding performed by inverse conversion of the channel encoding implemented during recording, and then reproduced as a data sector.

The reproduced data sector is sent to the HDC40, error correction decoding performed and then sequentially stored in the buffer memory 41 as logic data in 512 byte units. The buffered data is then sequentially transferred to the host memory 24 by way of the host interface bus 30 and the memory controller circuit 23 and one cluster is formed. When read-out of one cluster is complete, the read-out of the next cluster is commanded in the same way as previously described, and the subsequent cluster formed in the host memory 24.

The now formed cluster is sequentially sent from the host memory 24, and supplied for example to the AV decoder 18 of Ch. 1 as an AV data stream. This AV data stream is separated into video data and audio data by the demultiplexer 17. When an error is present in the video data, interpolation processing is performed on data in front and behind by an interpolator 15. Then, elongation (or decompression) into related digital image information is performed by the video information decompressor 13 and this related digital information output externally. This externally output image information is converted to an NTSC analog video signal 11 by means of a D/A converter, and supplied to an external monitor, etc.

The case when using only Ch. 1 was utilized for describing above, the flow of the compressed data recording and reproducing signals. Next however, a description of the case when recording/reproducing a plurality of data streams containing data for Ch. 2 and Ch. 3 is also given.

Figure 5:
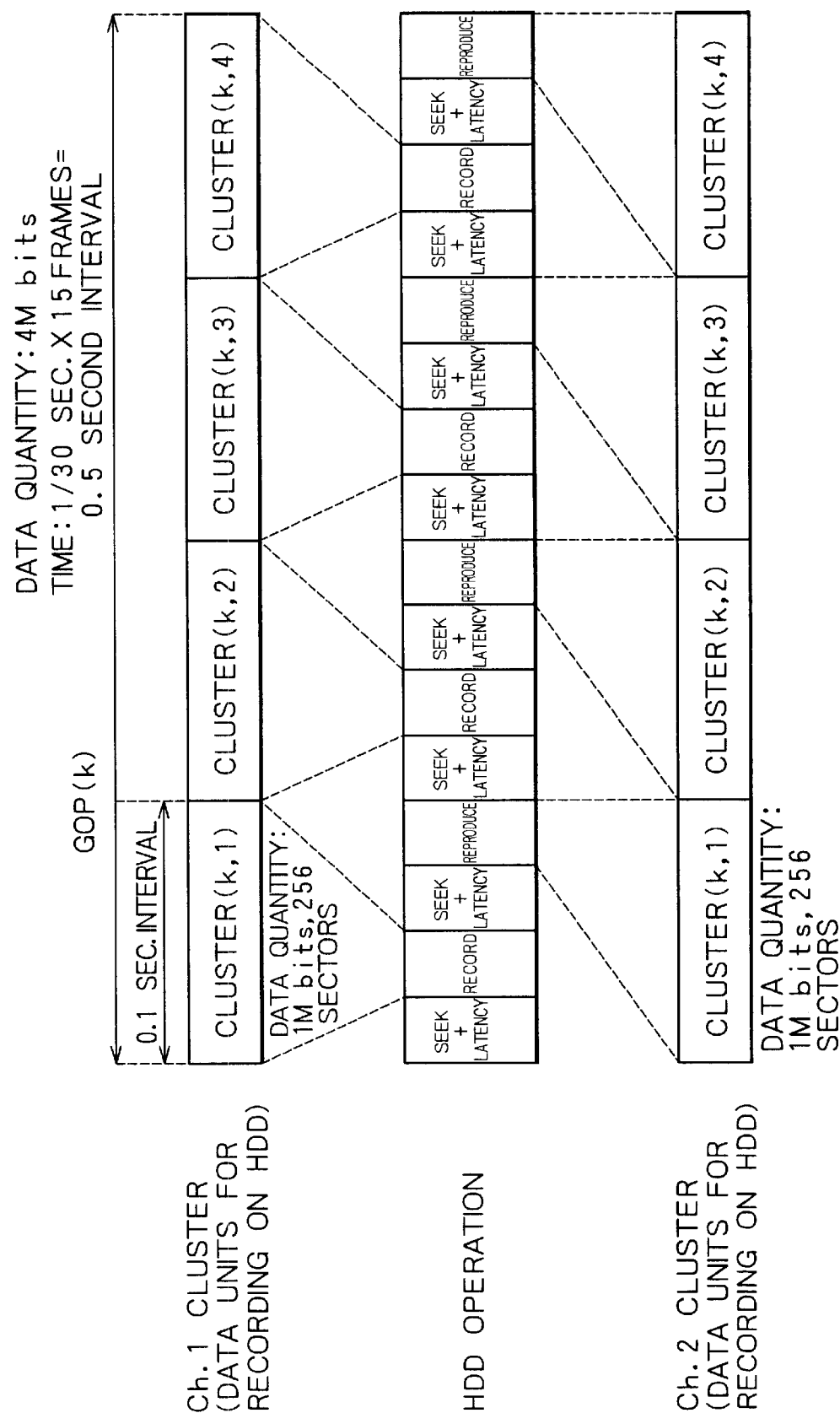
FIG. 5 is a timing chart showing typical operation in HDD 55 when reproducing a channel 2 data stream, simultaneous with recording of a channel 1 data stream.

FIG. 5 is a typical timing chart showing the case when reproducing a Ch. 2 data stream, simultaneous with recording of a Ch. 1 data stream.

Only one head at time can operate in the HDD 55 so only one cluster can be recorded or reproduced at one time. Therefore, clusters for two channels are alternately recorded or reproduced. In order for instance, to access an area for recording the cluster (k, 1) of Ch. 1, seek and rotation standby (S1) is performed, and the cluster (k, 1) recorded. Next, seek and rotation standby (S2) is implemented to reproduce the cluster of Ch. 2, enclosing the surplus time (E). This seek operation is necessary because clusters on different channels are usually present in tracks of completely different diameters on the disk. Next, reproduction (R2) of cluster (k, 1) is set. This series of actions is then repeated. In the example of FIG. 5, available time (E) remains, even if simultaneously recording/reproducing two channels on one HDD 55 unit.

Figure 6:
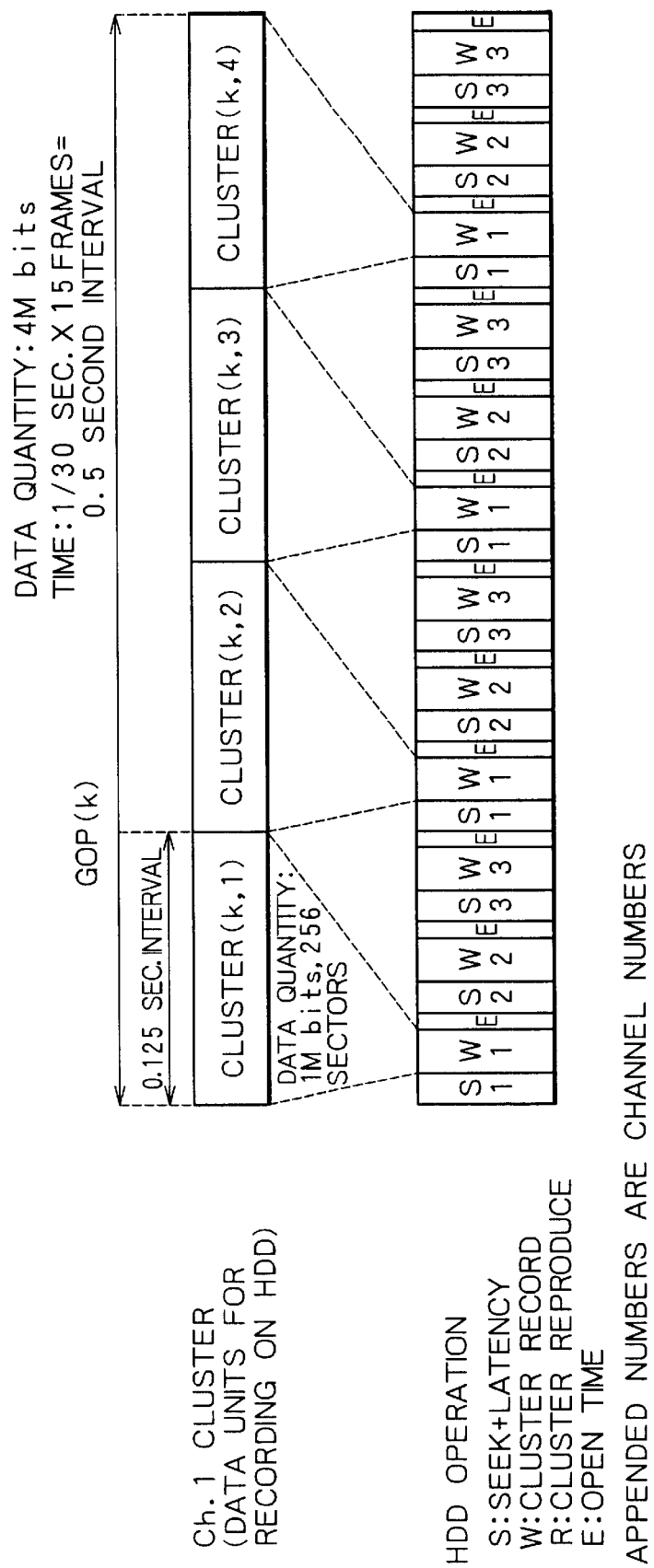
FIG. 6 is a timing chart showing typical operation in HDD 55 when simultaneous recording three channels (in other words, Ch. 1, Ch. 2, and Ch. 3).

FIG. 6 is a timing chart showing simultaneous recording of three channels (in other words, Ch. 1, Ch. 2, and Ch. 3). Three data streams consisting of a data stream generated by the Ch. 1 AV encoder from the host side, a data stream generated by the Ch. 2 encoder, and a Ch. 3 input data stream are sequentially recorded in the host memory 24 by the memory controller 23. These three data streams are split into respective clusters, and alternately recorded on the HDD 55 by write instructions on the host interface bus 30. The write instructions are host commands specified by the expansion IDE interface as the host interface.

The HDD 55 can only access one channel cluster at a time, the same as the previously described two-channel simultaneous operation of FIG. 5, so that recording of the three channels is performed alternately.

In the example shown in FIG. 6, the HDD 55 is busy using almost all the processing time for seek or recording or reproduction operation, and the surplus time (E) is extremely short. Obtaining a long surplus time (E) is difficult when the digital motion picture disk recorder is simultaneously recording/reproducing on the maximum number of channels that the speed of the HDD 55 allows.

The recording and reproduction operation of the digital motion picture disk recorder was performed as described above. As the above explanation clearly shows, the HDD 55 operation status varies depending on the number of channels handled by the digital motion picture disk recorder at that time. Namely, in the above recorder capable of simultaneous record/reproduction up to a maximum of three channels, though the HDD 55 only has a slight empty (surplus) time during simultaneous operation of these three channels, there is a considerable amount of empty time when operating on only one channel. Furthermore, during normal operation the disk recorder is almost never constantly operating on the maximum number of channels, and there are always times when the disk recorder is operating on only a few channels. The system controller software for the digital motion picture disk recorder knows the number of channels in simultaneous operation so the empty (surplus or available time) on the HDD 55 can be estimated.

Next, application of the HDD 55 to AV operation is described.

In Table 1 below, typical settings of the host interface command system for different types of AV operation in the present invention are shown. In this command system, the vendor-unique instructions can be defined, according to the ATA (AT attachment) standard (equivalent to the expansion IDE standard) of ANSI. This instruction system is hereafter referred to as the AV command set.

TABLE 1

| COMMAND TYPES | COMMAND DESCRIPTION |
|---|---|
| Set AV configuration | Send specified configuration data to disk device, and change to AV mode. |
| Read AV stream | Reproduce data sector with limit on error processing time. |
| Write AV stream | Record data sector with limit on error processing time. |

When for instance, a "Set AV Configuration" command is entered on the host side (more specifically, CPU-A27 to run the HDD device driver) by way of the host interface bus 30, a specified parameter value is set in the internal register of the HDC40, and the disk device switches to AV mode (described later). Also, the "Read AV stream" and "Write AV stream" are respectively dedicated commands for record and reproduction of the AV data streams.

In this embodiment, the AV command set was vendor-unique commands conforming to ATA standards but when standardized to normalized commands, even though the command No. changes, the functions may be considered essentially the same as in the present invention. Also, host interface standards other than ATA standards can also be defined for an AV command set having the same functions. In other words, there is no dependence on interface standards other than to impart a tangible form to the present invention.

The HDD 55 of this embodiment is comprised of two types of operating modes; the IT (information technology) mode and the AV (audio visual) mode.

The IT mode is an operating mode suited for record or reproduction of non-consecutive (in other words, discrete) information. More specifically, the IT mode is a mode for performing roughly the same operations as a related HDD designed for recording and reproducing of computer data. In the IT mode, data reliability is stressed rather than real-time continuity of record/reproduction, and no time limits are set on error processing. In other words, the IT mode is suited for handling data that requires high reliability, such as computer data.

The AV mode on the other hand, is an operation mode suited for record or reproduction of continuous information. More specifically, in order to handle AV data consisting of video information and audio information, in recording or reproduction, the AV mode is an operation mode stressing real-time continuity rather than data reliability, and time limits are set on error processing. In other words, the AV mode is suited for handling data requiring real-time characteristics such as motion picture and audio data.

Figure 7:
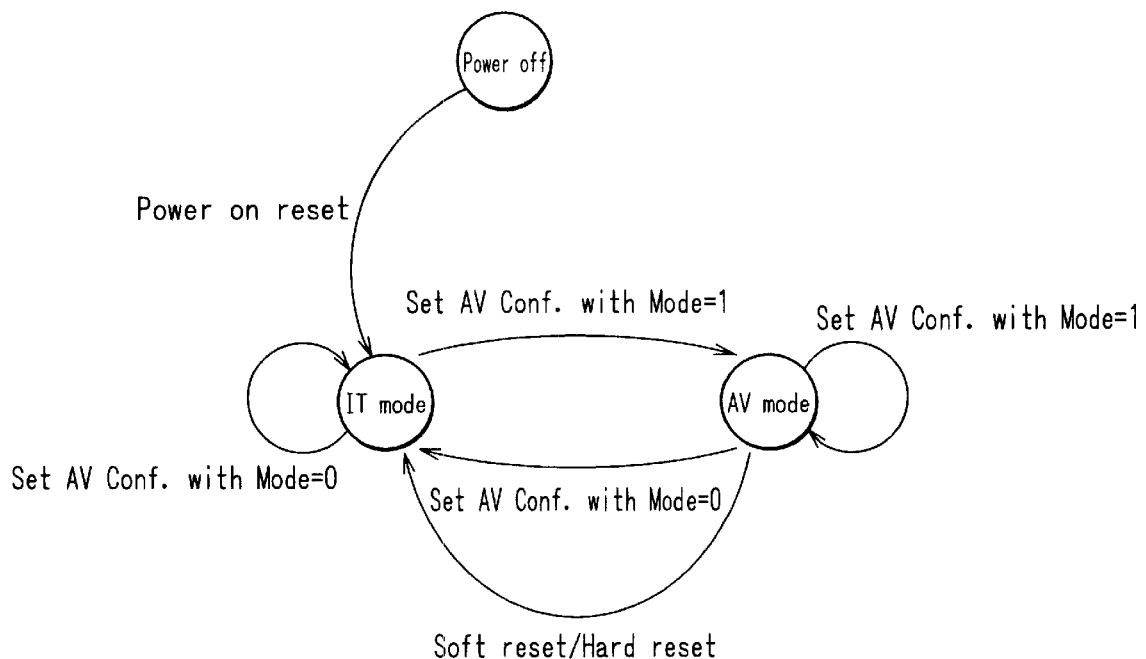
FIG. 7 is a drawing showing an operation mode transition chart for the HDD 55 of this embodiment.
Figure 8:
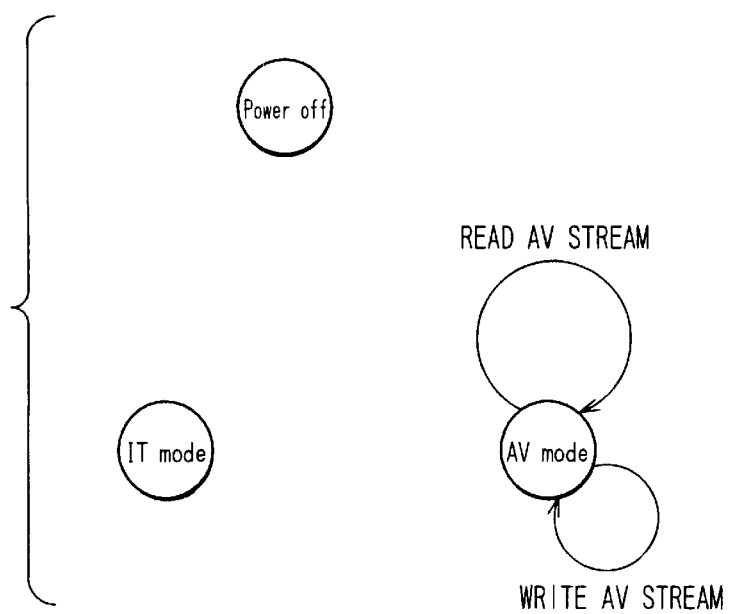
FIG. 8 is a drawing showing an operation mode transition chart for the HDD 55 of this embodiment.

FIG. 7 and FIG. 8 are drawings showing operating mode transition diagrams for the HDD 55 of this embodiment. Hereafter, the operating characteristics of the HDD 55 are explained while referring to these transition diagrams.

When the power is turned on, the HDD 55 first starts up in IT mode. The host (more specifically, the CPU-A27 running the HDD disk driver) along with issuing a "SET AV CONFIGURATION" command (instruction code 80$h$) to the HDD 55, can also command a transition to AV mode by sending "Set AV Configuration Data" (See FIG. 7). Also, after switching to AV mode, the HDD 55 maintains AV mode as long as an AV command set such as "Read AV stream" or "Write AV stream" is continually used (See FIG. 8).

The respective data configurations for the input register inside the HDC40 during issue of the "SET AV CONFIGURATION" command, and the command parameter data "Set AV Configuration Data" are shown in Table 2 and Table 3 below.

TABLE 2

| Register | 7 | 6 | 5 | 4 | 3 | 2 | 1 | 0 |
|---|---|---|---|---|---|---|---|---|
| Features | | | | | na | | | |
| Sector Count | | | | | na | | | |
| Sector Number | | | | | na | | | |
| Cylinder Low | | | | | na | | | |
| Cylinder High | | | | | na | | | |
| Device/Head | obs | na | obs | DEV | | | na | |
| Command | | | | | 80h | | | |

TABLE 3

| Word | Content | | |
|---|---|---|---|
| 0 | Bit 0 | Mode | 0 = IT mode |
| | Bits 1–15 | Reserved | 1 = AV mode |
| 1 | Bit 0 | Read continuous | 0 = off |
| | Bits 1–7 | Reserved | 1 = on |
| | Bits 8–15 | Reserved | |
| 2 | Reserved | | |
| 3 | Reserved | | |
| 4 | Total error recovery time limit per READ AV STREAM command [ms] | | |
| 5 | Total error recovery time limit per WRITE AV STREAM command [ms] | | |
| 6 | Bits 0–3 | Total number of streams | |
| | Bits 4–15 | Reserved | |
| 7–255 | Reserved | | |

The instruction code for the "SET AV CONFIGURATION" is 80$h$, and as shown in Table 2, the instruction code 80H is written into the command register in the input register. Also, when a 1 is written into the word 0 bit position of "Set AV Configuration Data" used for making AV mode settings, the DD 55 responds by switching to AV mode (switches to IT mode if a 0 is in the bit position 0). Each time the "SET AV CONFIGURATION" command is issued, the HDD 55 switches to IT mode or AV mode according to whether a 0 or a 1 is present in the bit 0 position.

In IT mode, the recording or reproduction of computer dats in the HDD 55 is specified by normal READ commands or WRITE commands established in the related ATA standards.

In the AV mode however, the recording or reproduction of the AV data stream in the HDD 55 is commanded by utilizing the "Read AV stream" command, and the "Write AV stream" command as shown in Table 1.

In AV mode, the passive parameter group required to execute these two record/reproduction commands is set by the "Set AV Configuration Data" shown in Table 3. In other words, during execution of the "Read AV stream" command in AV mode, the data contents of Word 4 are specified to the HDD 55 in maximum allowable error processing (error recover time limit) time in milliseconds. In the same way, during execution of the "Write AV stream" command in AV mode, the data contents of Word 5 are specified to the HDD 55 in maximum allowable error processing (error recover time limit) time in milliseconds. Also, the data contents of Word 6, are shown as the total number of AV data streams simultaneously recorded or reproduced, utilizing the four bits of the bit positions, 0 through 3.

When the host (more specifically, the CPU-A27 running the HDD disk driver) sets the HDD 55 to AV mode, the HDC40 and the CPU-B42 inside the HDD 55, store the maximum error processing time (error recovery time) when executing one "Write AV stream" command, according to the "Set AV Configuration Data" contents of word 5.

Causes of errors during execution of the record command, in other words, "Write AV stream" are seek errors on the track where the sector for recording is present, and an off-track head position due to vibration impacts during recording, and record head abnormalities during recording, etc. In the case of a seek error for instance, an error processing (recovery) time of several milliseconds is required for the head to re-seek to the target track after mistakenly arriving at another track. In the case of an off-track or head abnormality, an error processing (recovery) time including rotation standby time (for instance, 11.1 msec when the rotation frequency is 90 Hz) is required since the head 50 must retry recording of data after being in rotation standby until once again arriving at the target sector.

During error recovery such as from an error occurring during execution of a record command, the CPU-B42 measures the time until error processing is complete, with a timer. When the maximum error processing (recovery) time specified in "Set AV Configuration Data" is exceeded, that error processing is stopped, and operation shifts to the next recording or reproducing command. The real-time continuity of that next recorded or reproduced data is therefore maintained.

When the host has set the HDD 55 in AV mode, the HDC40 and the CPU-B42 inside the HDD 55, in the same way, store the maximum error processing (recovery) time when executing one "Read AV stream" command, according to the word 4 contents of "Set AV Configuration Data".

Seek errors on the track holding the target reproduction sector, and data detection errors during reproduction are listed as errors occurring during execution of the reproduction command or in other words, "Read AV stream". The CPU-B42 uses a timer to measure the time from the occurrence of the error, until error processing is complete. When the maximum error processing (recovery) time specified in "Set AV Configuration Data" is exceeded, that error processing is stopped, and operation shifts to the next recording or reproducing command. The real-time continuity of that next recorded or reproduced data is therefore maintained.

Therefore, by setting an upper limit (threshold) for error processing (recovery) time, when one error occurs requiring a long error recovery time and delaying execution of the next command, the above operation satisfactorily prevents damage to the real-time continuity of the AV data stream.

The surplus (empty) time (E) during HDD 55 operation in the digital motion picture disk recorder, as shown in FIG. 4, FIG. 5 and FIG. 6, fluctuates greatly according to the number of data base streams for simultaneous recording or reproduction, or in other words, the number of channels. The CPU-A27 on the host side is informed of the number of simultaneous record/reproduction channels by user instruction. Therefore, when a change in the number of simultaneous record/reproduction channels has occurred, a "SET AV CONFIGURATION" command is issued to the HDD 55, and the maximum error processing (recovery) time setting is readjusted according to the number of channels.

When for example, there are a large number simultaneous record/reproduction channels, the maximum error processing (recovery) time is shortened. Conversely, when the number of simultaneous record/reproduction channels is small, the maximum error processing (recovery) time is lengthened so that an optimum error processing time is obtained while maintaining real-time continuity in the HDD 55.

In the above description, the "Set AV Configuration Data" parameter for the AV mode setting command for recording and reproduction had a maximum error processing (recovery) time that was specified in milliseconds. However other time units (such as microseconds) may be used for specifying and measuring time, and of course the same effect of the invention can be obtained.

Next, the current operating conditions of the digital motion picture disk recorder such as the number of simultaneous record/reproduction channels are determined and a "SET AV CONFIGURATION" command is issued to the HDD 55. The measure taken when real-time continuity is difficult to maintain due to some kind of error occurring after the AV data stream record or reproduction operation starts is explained next.

For instance, if errors larger than expected by the host continually occur during execution of continuous record or reproducing command, then the maximum allowable error processing time will be used up trying to recover from these errors. In this kind of situation, the amount of reproduction data stored in the buffer memory 41 and the host memory 24 of the HDD 55 reaches zero, the average data rate required by the AV decoder 18 cannot be maintained, and the motion picture image quality deteriorates during reproduction (playback).

As one simple measure to improve this situation, a means is provided to specify the urgency (criticality) for issue of individual AV record commands and AV reproduction commands, without newly issuing the "SET AV CONFIGURATION" command.

The data configuration in the input register inside the HDC40 during issue of the "Read AV stream" command is shown in Table 4 below.

TABLE 4

| Register | 7 | 6 | 5 | 4 | 3 | 2 | 1 | 0 |
|---|---|---|---|---|---|---|---|---|
| Features | URG | DMA | na | | | | | Stream ID |
| Sector Count | | | Sector count | | | | | |
| Sector Number | | | Sector number of LBA | | | | | |
| Cylinder Low | | | Cylinder number of LBA | | | | | |
| Cylinder High | | | Cylinder number of LBA | | | | | |
| Device/Head | obs | LBA | obs | DEV | Head number or LBA | | | |
| Command | | | 81h | | | | | |

The instruction code for the "Read AV stream" command is 81h. The instruction code 81h is written into the command register inside the input register as shown in Table 4.

The bit position 7 (URG) of the Features register bit in the input register is defined as the Urgent bit to show the urgency (or criticality) level of the command processing. The urgency level for executing that command is high when the bit URG is a 1. In this case, the maximum error processing (recovery) time setting with the "SET AV CONFIGURATION" command parameter is temporarily ignored, and the error processing time is shortened as much as possible for that command's reproduction operation. More specifically, only correction processing with correction encoding requiring virtually no time is performed, and processing that requires time, such as retries are not performed. These measures allow the reproduction operation time to be shortened and allows avoiding critical situations that might harm the real-time continuity of the AV data stream.

When the quantity of reproduction data stored in the host memory 24 reaches a sufficient level and the critical situation (urgent status) has been eliminated, the host sets this Urgent bit (URG) to 0 during issued of the subsequent "Read AV stream" command. The error processing time in the HDD 55 is thus reset to the maximum allowable error value that was previously set in the "Set AV Configuration Data" parameter of the "SET AV CONFIGURATION" command.

The data configuration of the input register inside the HDC40 during issue of the "Write AV stream" command is shown in Table 5 below.

TABLE 5

| Register | 7 | 6 | 5 | 4 | 3 | 2 | 1 | 0 |
|---|---|---|---|---|---|---|---|---|
| Features | URG | DMA | na | | | | | Stream ID |
| Sector Count | | | Sector count | | | | | |
| Sector Number | | | Sector number of LBA | | | | | |
| Cylinder Low | | | Cylinder number of LBA | | | | | |
| Cylinder High | | | Cylinder number of LBA | | | | | |
| Device/Head | obs | LBA | obs | DEV | Head number or LBA | | | |
| Command | | | 82h | | | | | |

The instruction code for the "Write AV stream" command is 82h. The instruction code 82h is written into the command register inside the input register as shown in Table 5.

The bit position 7 (URG) of the Features register bit in the input register is defined as the Urgent bit to show the urgency (or criticality) level of the command processing. The urgency level for executing that command is high when the bit URG is a 1. During recording with the disk recorder, the urgency level becomes high when the AV encoder output data stored in the host memory 24 exceeds a level that can be stored and overflows. When URG=1, error processing requiring time, such as retries are not performed by the HDD 55. The data stored in the host memory 24 is thus speedily recorded in the HDD 55, and critical situations (or urgent status) that halt the continuity of the data stream can be eliminated.

The "Set AV Configuration" command sends the "Set AV Configuration Data" parameter having the format shown in Table 3, to the HDD 55. The parameter, as previously related, shows the simultaneous record or reproduced AV data stream or in other words, the maximum number of channels, by using the four bits of bit positions 0 through 3 of that word 6. By receiving that maximum number of channels from the host, the HDD 55 can assign a widest possible memory (storage) area within the buffer memory 41, to each channel beforehand. The larger the capacity of this buffer, the easier it is to maintain real-time continuity in the AV data stream, so the buffer capacity for each channel is made as large as possible.

When the host cannot inform the HDD 55 of the maximum number of channels, an optimal division of the buffer memory space cannot be made on the HDD 55 side. The available memory area therefore cannot be used effectively, or the division of the memory area is smaller than the total number of channels to be handled so that data streams are present which do not have their own memory area. The efficiency of data exchange with the host then deteriorates and problems occur. Restated, the HDD 55 of this embodiment is provided with a means to know the maximum (total) number of channels so that the above mentioned technical problems are resolved.

When the "Read AV stream" command and the "Write AV stream" command are issued as shown in Table 4 and Table 5, the host writes a stream identifier (stream ID) in bit position 0 through 2 of the Features register in the input/output register. This stream identifier (stream ID) is a number especially for the data stream for recording or reproducing.

The HDD 55 utilizes this stream identifier to know what data stream or in other words, what channel the sector for recording or reproducing data belongs to. Therefore, the record data or the reproduction data can be stored in each correct respective memory (storage) area of the buffer memory 41 which is divided up into data streams.

The CPU-B42 inside the HDD 55 checks whether or not data specified by a command is already present in the buffer memory 41. If data specified by a command is present in the buffer memory 41, and if an AV reproduction (playback) command, then the data in the buffer memory 41 is transferred to the host without loading it from the disk 49. If the data is an AV record command, then the data is optimized for writing onto the disk 49, or in other words, cache processing is performed. When no stream identifier (stream ID) has been assigned, the check by the CPU-B42 is performed for the entire empty memory space inside the buffer memory 41 creating a large unwanted overhead in terms of command processing.

In the present invention, along with issue of a "Read AV stream" command, the stream identifier (stream ID) is also given so that a check can be made on the buffer memory 41 limited to the memory (storage) area corresponding to the assigned stream identifier and related area so that no check is made of the entire empty memory area of the buffer memory 41 and the processing overhead can therefore be greatly reduced.

The present invention was described while referring to specific embodiments. However, as is clear to one skilled in the art, amendments or substitutions to the aforesaid embodiments may be made provided such changes are within the spirit and scope of the present invention.

The embodiment of the present invention for instance, was explained as a disk type data record/reproduction device suited for use in digital motion picture recorders, however the present invention is not limited to use in digital motion picture recorders. The present invention may be satisfactorily adapted for instance, to disk type data record/reproduction devices connected to general-purpose computer systems by means of expansion IDE, SCSI or other interfaces.

In other words, the embodiments of the present invention are only intended as examples and should not be intended as limiting the invention in any way. The section with the patent claims at the beginning of these specifications patent claims should be referred to in order to judge the meaning of the present invention.

The present invention as described above, provides a disk type data record/reproduction device ideal for processing of recording/reproducing audio visual data streams requiring real-time characteristics.

The present invention also provides a disk type data recording/reproducing device ideal for maintaining video recorder real time characteristics, improving the average data rate and number of audio-visual data streams capable of simultaneous record/reproduction, and further capable of high speed recording/reproducing of high quality audio-visual data.

The present invention further provides a disk device having operation modes suitable for recording and reproduction of data requiring real-time continuity by limiting the error processing time. Therefore, the host incorporating the disk device of the present invention can easily control the real-time continuity.

The present invention still further provides the effect that the host can specify the urgency of individual record/reproduction instructions to the disk device so that so that control of real-time continuity can be actively implemented in better detail.

Also in the present invention, the host can also inform the disk device of the required throughput by possessing a means to assign individual stream numbers and total numbers constituting a plurality of simultaneously recorded or reproduced data streams. The disk device is therefore capable of optimal internal processing such as data buffering.

The disk device of the present invention unlike disk devices designed to handle discrete data in ordinary computer applications, is capable of suitable handling of real-time continuity information such as motion picture and audio information. Therefore, by applying the disk device of the present invention to recording mediums such as video recording devices, real-time continuity of data for recording and reproduction can be obtained. Furthermore, the throughput for data record and reproduction of the disk device can be improved so that effects are obtained such as increasing the number of data streams simultaneously handled such as by a video recording device or the image quality can be enhanced by improving the average data rate.

What is claimed is:

1. A disk recording/reproduction device comprising a first operation mode stressing reliability of data more than real-time continuous recording and reproduction and, a second operation mode stressing real-time continuous recording and reproduction more than the reliability of the data.

* * * * *